Sept. 10, 1968 C. F. ERIKSON 3,400,987

MACHINE TOOL

Filed July 8, 1966

Inventor
Carl F. Erikson
By Hofgren, Wegner,
Allen, Stellman & McCord
Attys

United States Patent Office 3,400,987
Patented Sept. 10, 1968

3,400,987
MACHINE TOOL
Carl F. Erikson, Belvidere, Ill., assignor to Sundstrand Corporation, a corporation of Illinois
Filed July 8, 1966, Ser. No. 563,783
3 Claims. (Cl. 308—3.5)

ABSTRACT OF THE DISCLOSURE

Sealing mechanism for bearing mount having anti-friction way bearings wherein seal members disposed both transversely and longitudinally of the component movement make an effective seal by being in overlapped relation, with the longitudinal seal member being a relatively slippery member yieldably urged toward the way.

---

This invention relates to machine tools and, more particularly, to sealing means associated with anti-friction way bearings.

In the past few years, the accuracy of machine tools has become increasingly important and improvements have been made in the mounting of movable machine tool components on ways including the use of anti-friction way bearings. An example of such an improved bearing is shown in my application, Ser. No. 275,801, filed Apr. 23, 1963, now Patent No. 3,245,731, which discloses a ball bearing package. The use of such anti-friction way bearings has resulted in a slight amount of space between the way and the bearing mount associated with the movable components. End covers are associated with the bearing mount and extend transversely of the way to wipe along the way during movement and seal the ends of the chamber within the bearing mount which contains the anti-friction way bearings. This still does not prevent entry of chips into the interior of the bearing mount, particularly with the use of air in machine tool operation and means have been provided to seal the sides of the chamber to reduce the possibility of chips getting into the chamber and interfering with the operation of the anti-friction way bearings.

An object of this invention is to provide a new and improved sealing structure for anti-friction bearings associated with a machine tool way.

Still another object of the invention is to provide a machine tool having a bearing mount for a plurality of anti-friction bearings associated with a way with the bearing mount having end covers extending transversely of the way to seal off the ends of the bearing mount chamber in which the bearings are positioned and with means extending parallel to the way to seal off the sides of the chamber against chip entry including a flexible member floatingly mounted and yieldably urged into engagement with the way.

A further object of the invention is to provide a machine tool as defined in the preceding paragraph in which the member is formed of a relatively slippery, self-lubricating material and is positioned within a groove in a mounting plate affixed to the movable component of the machine tool and with a plurality of leaf springs positioned between the base of the groove and the member and floatingly and yieldably urging the member outwardly of the groove toward the way to hold the member against the way and have the member conform to the way surface, with each of the springs being of a relatively flat, V-shape and having a bent end inserted in a notch in the member to hold the spring located and with the opposite end of the spring member being slidably movable along the member as required by the flexing of the spring.

Figure 1:
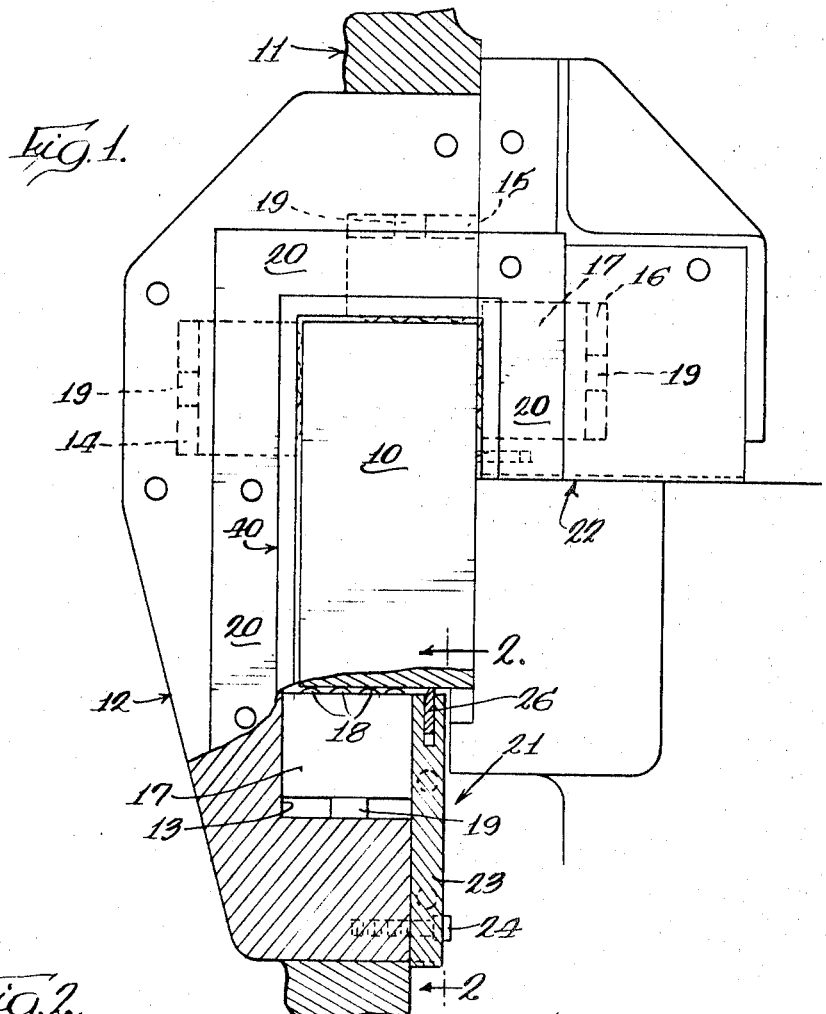
Figure 2:
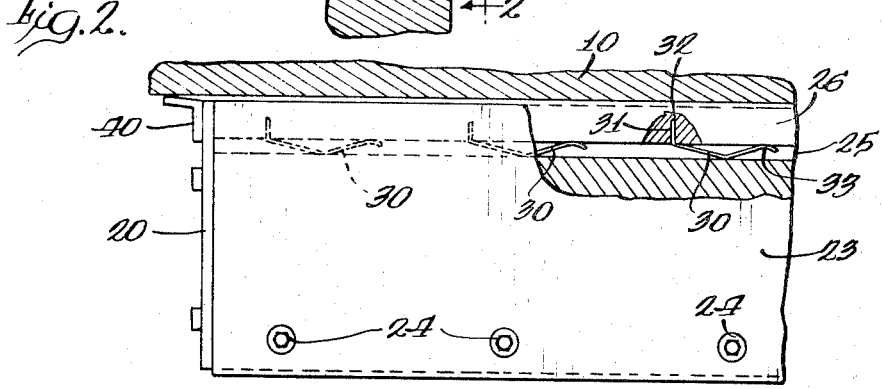

Further objects and advantages will become apparent from the following detailed description taken in connection with the accompanying drawings in which:

FIG. 1 is a plan view of a portion of a machine tool component showing the bearing mount in association with a way and with a part of the bearing mount broken away to show an anti-friction way bearing and its mounting; and FIG. 2 is a fragmentary view, taken along the line 2—2 in FIG. 1 and with a part of the mounting plate broken away.

While this invention is susceptible of embodiment in many different forms, there is shown in the drawings and will herein be described in detail an embodiment of the invention with the understanding that the present disclosure is to be considered as an exemplification of the principles of the invention and is not intended to limit the invention to the embodiment illustrated. The scope of the invention will be pointed out in the appended claims.

An embodiment of the invention is disclosed in FIGS. 1 and 2 in which a generally rectangular way 10 has a movable component of a machine tool, such as a spindle head, indicated generally at 11, mounted for movement therealong. A portion of the machine tool component defines a bearing mount 12 having an interior chamber extending lengthwise along the way and having a plurality of recesses 13, 14, 15 and 16. Each of the recesses has an anti-friction way bearing loosely mounted therein, with the bearing body indicated at 17. More specifically, the bearing package can be the construction disclosed in my previously referred to copending application. As disclosed in the prior application, the ball bearing package has a body which supports one or more series of ball bearings 18 for providing anti-friction support against the way. The package body is supported for self-aligning movement by a mounting block 19 positioned in the lower part of the recess whereby the bearing package can adjust to the alignment between the machine tool component and the way.

With the anti-friction way bearing in the form of rollers or balls, there results a space between the way 10 and the bearing mounting. This space, unless closed off, would permit entry of chips produced during the machining operation into the area of the bearings which can interfere with proper action of the bearings. This chip entry can even more readily occur when air is used for cleaning off of a workpiece. End covers are provided at each end of the bearing mounting which extend transversely to the length of the way, with the end cover 20 having a wiper 40 spanning the space between the bearing mount and the way to wipe the way free of chips as the bearing mount moves along the way. This closes the ends of the chamber surrounding the way, but does not close off the sides.

In order to effectively seal off the chamber at its sides, wiper means are provided, associated with the bearing mount and movable relative to the way. A pair of side wipers are shown in FIG. 1, and indicated generally at 21 and 22. The side wiper 21 is shown, more particularly, in FIG. 2. This wiper comprises a plate 23 extending lengthwise of the bearing mounting and attached thereto by suitable threaded fasteners 24. The plate 23 has a groove 25 formed lengthwise along an edge thereof which receives a wiper member 26. The wiper member 26 is formed of a slightly flexible, slippery and self-lubricating material, such as Panelyte. The wiper member is floatingly and yieldably mounted in the groove 25 and urged against the way 10 to form a seal with the way. The floating and yielding mounting is provided by a series of leaf spring members, shown particularly in FIG. 2, with each of these spring members being of the same construction. The leaf spring member 30 has a bent end 31 fitting in a hole 32 formed in the back side of the wiper member 26 to locate and retain the spring in a fixed location. The spring has a V-shaped body and a curved opposite end 33 which can slide along the rear edge of the wiper member as the spring contracts or elongates, with the apex of the intermediate spring section abutting against the bottom of the groove 25 in the plate 23. The spring can be either of round wire or of flat material.

The number of springs 30 to be used is determined by the force required to obtain flexing of the member to conform to the way surface and give the desired degree of float along the length of the wiper member 26. With the wiper member having a length of approximately 25 inches, eight springs have been found to be a desirable number.

The construction of the side seal 22 is the same as that for the side seal structure 21, although being disclosed in a different plane, as shown in FIG. 1.

With the structure described herein, as the movable component moves along the way 10, the bearing mount 12 supports the component and the end wiper 40, located at each end of the bearing mount, substantially wipes clean the way and blocks the space between the ends of bearing mount and the way. Additionally, the wiper members 26 sealing the sides of the bearing mount chamber can slide along the way 10 and flex under the urging of the springs to maintain a seal to prevent chips from entering into the area of the bearings.

I claim:

1. In a machine tool having a component movable along a way, a bearing mount associated with the component disposed about at least three sides of the way and defining a chamber to receive the way, a plurality of ball bearing packages mounted on said component and engageable with said way with the bearing mount spaced from the way, end covers for said chamber extending across the way surfaces and engageable therewith to seal off the ends of said chamber, and blade wiper means for sealing a side of the chamber including a plate extending lengthwise of the bearing mount and having a groove opening toward said way, a wiper member of relatively slippery, self-lubricating flexible material positioned in said groove, a plurality of springs positioned in said groove along the length thereof and engageable with the member to floatingly mount and yieldably urge the wiper member against the way.

2. In a machine tool as defined in claim 1 wherein each of said springs is a V-shaped spring with an end of each spring locked to said member by engagement of a bent end thereof in a recess in said member.

3. In a machine tool having a component movable along a way, a bearing mount associated with the component disposed about at least three sides of the way and defining a chamber to receive the way, at least one ball bearing package mounted on said component and engageable with said way with the bearing mount spaced from the way, end covers for said chamber extending across the way surfaces with wipers extending transverse to motion of said component engageable with the way surfaces to seal off the ends of said chamber, and blade wiper means for sealing a side of the chamber including a member having a groove extending parallel to the motion of said component and a wiper member of relatively slippery flexible non-porous material positioned in said groove and having a flat smooth surface, spring means engageable with the last-mentioned wiper member to floatingly mount and yieldably urge the wiper member surface against the way, said end cover wipers overlapping said wiper member to completely seal off the interior of said bearing mount.

References Cited

UNITED STATES PATENTS

| | | | |
|---|---|---|---|
| 1,991,177 | 2/1935 | Rutz et al. | |
| 2,908,028 | 10/1959 | Runton et al. | |
| 2,951,728 | 9/1960 | Drake | 308—3.5 |
| 3,139,652 | 7/1964 | Michaels | 49—481 |
| 3,245,731 | 4/1966 | Erikson | 308—6 |

EDGAR W. GEOGHEGAN, *Primary Examiner.*

C. B. DORITY, *Assistant Examiner.*